United States Patent
Okabe et al.

(10) Patent No.: US 10,747,308 B2
(45) Date of Patent: Aug. 18, 2020

(54) LINE-OF-SIGHT OPERATION APPARATUS, METHOD, AND MEDICAL DEVICE

(71) Applicant: FUJIFILM Corporation, Tokyo (JP)

(72) Inventors: Yuuki Okabe, Tokyo (JP); Mayuko Ikuta, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 77 days.

(21) Appl. No.: 15/896,628

(22) Filed: Feb. 14, 2018

(65) Prior Publication Data

US 2018/0173305 A1 Jun. 21, 2018

Related U.S. Application Data

(63) Continuation of application No. PCT/JP2016/070632, filed on Jul. 13, 2016.

(30) Foreign Application Priority Data

Sep. 16, 2015 (JP) .................................. 2015-182790

(51) Int. Cl.
*G06F 3/01* (2006.01)
*G06F 3/0481* (2013.01)
(Continued)

(52) U.S. Cl.
CPC ................ *G06F 3/013* (2013.01); *G06F 3/01* (2013.01); *G06F 3/017* (2013.01); *G06F 3/0304* (2013.01);
(Continued)

(58) Field of Classification Search
CPC . G06F 3/01; G06F 3/013; G06F 3/017; G06F 3/0304; G06F 3/0346; G06F 3/038;
(Continued)

(56) References Cited

U.S. PATENT DOCUMENTS 6,346,929 B1   2/2002  Fukushima et al.
2007/0239005 A1  10/2007  Ogasawara
(Continued)

FOREIGN PATENT DOCUMENTS

JP   H08-006708 A    1/1996
JP   2001-299691 A  10/2001
(Continued)

OTHER PUBLICATIONS

International Search Report issued in PCT/JP2016/070632; dated Aug. 16, 2016.
(Continued)

*Primary Examiner* — Jennifer N To
*Assistant Examiner* — Reji Kartholy
(74) *Attorney, Agent, or Firm* — Studebaker & Brackett PC

(57) ABSTRACT

The present invention provides a line-of-sight operation-apparatus, a method, and a medical device by which it is possible to appropriately determine whether a movement of a line-of-sight is intended by a user and to prevent the user from being forced to carry a burden. The line-of-sight operation-apparatus includes a display screen, a display control unit to display an icon having an animation-image on the display screen, a line-of-sight detection unit that detects a line-of-sight of a user, a following determination unit that determines, on the basis of a result of detection performed by the line-of-sight detection unit, whether a movement of the line-of-sight of the user follows a movement of the animation-image, and an output unit that outputs information indicating that the icon has been selected in the case where the following determination unit determines that the movement of the line-of-sight of the user follows the movement of the animation-image.

15 Claims, 15 Drawing Sheets

(51) Int. Cl.
*G06F 3/038* (2013.01)
*G06F 3/0346* (2013.01)
*G06F 3/03* (2006.01)
*G06F 3/0484* (2013.01)

(52) U.S. Cl.
CPC ............ *G06F 3/038* (2013.01); *G06F 3/0346* (2013.01); *G06F 3/0481* (2013.01); *G06F 3/04817* (2013.01); *G06F 3/04842* (2013.01)

(58) Field of Classification Search
CPC . G06F 3/0481; G06F 3/04817; G06F 3/04842
See application file for complete search history.

(56) References Cited

U.S. PATENT DOCUMENTS

| | | | | |
|---|---|---|---|---|
| 2014/0245227 | A1* | 8/2014 | Xu | G06F 3/04817 715/835 |
| 2014/0354539 | A1* | 12/2014 | Skogo | G06F 3/013 345/156 |
| 2015/0169052 | A1* | 6/2015 | Kramer | G06F 3/013 345/156 |
| 2015/0355815 | A1* | 12/2015 | Palti-Wasserman | G06F 3/013 715/835 |
| 2017/0212586 | A1* | 7/2017 | Lopez | G06F 1/1626 |

FOREIGN PATENT DOCUMENTS

| | | |
|---|---|---|
| JP | 2004-301869 A | 10/2004 |
| JP | 2005-135439 A | 5/2005 |
| JP | 2007-195892 A | 8/2007 |
| JP | 2012-128523 A | 7/2012 |
| JP | 2014-215815 A | 11/2014 |
| JP | 2015-093147 A | 5/2015 |
| WO | 2014/111924 A1 | 7/2014 |

OTHER PUBLICATIONS

Written Opinion issued in PCT/JP2016/070632; dated Aug. 16, 2016.

International Preliminary Report on Patentability issued in PCT/JP2016/070632; dated Mar. 20, 2018.

Extended European Search Report issued by the European Patent Office dated Jun. 29, 2018, which corresponds to EP16846085.5-1216 and is related to U.S. Appl. No. 15/896,628.

Augusto Esteves et al., "Orbits: Gaze Interaction for Smart Watches using Smooth Pursuit Eye Movements", Proceedings of the 28th Annual ACM Symposium on User Interface Software & Technology, UIST '15, ACM Press, New York, New York, USA, Nov. 5, 2015, pp. 457-466.

* cited by examiner

LINE-OF-SIGHT OPERATION APPARATUS, METHOD, AND MEDICAL DEVICE

CROSS-REFERENCE TO RELATED APPLICATIONS

This application is a Continuation of PCT International Application No. PCT/JP2016/070632 filed on Jul. 13, 2016, which claims priority under 35 U.S.C § 119(a) to Japanese Patent Application No. 2015-182790 filed on Sep. 16, 2015. Each of the above application(s) is hereby expressly incorporated by reference, in its entirety, into the present application.

BACKGROUND OF THE INVENTION

1. Field of the Invention

The present invention relates to a line-of-sight operation apparatus, a method, and a medical device, and particularly to a line-of-sight operation technique by which it is possible to appropriately determine whether a movement of a line of sight is intended by a user and by which the user can be prevented from being forced to carry a burden.

2. Description of the Related Art

An operation technique using a line of sight has been known as a related art. In addition, a known technique also enables, not only simple detection of the position to which the line of sight is directed (line-of-sight position), but also appropriate grasp of a user's intension by combining another type of a detection method.

For example, JP2001-299691A discloses that, in a case in which a user keeps gazing at an icon (e.g., "reduce light quantity" icon) displayed on a display unit for a predetermined period time or longer, further depresses a foot switch to audibly input the name of the icon (e.g., "reduce light quantity"), the user operation is confirmed, and an action corresponding to the icon is executed. An icon for operation having a square frame is typically referred to as a "switch" or "button".

JP2015-93147A discloses that, in a case in which a user specifies the position of an image by using his/her line of sight, further audibly inputs an action (e.g., "enlarge" or "reduce"), an action corresponding to the audio is executed from the specified position as a start point.

JP2012-128523A discloses that, in a case in which the frequency of a user's blink is higher than a threshold value and a period in which his/her line of sight is directed to a predetermined input unit is longer than a threshold value, the user is specified as an operator.

JP2007-195892A discloses that, after the current line-of-sight position has been calculated and displayed by using a pointer on a display unit and a user has moved his/her line-of-sight position to move the pointer, it is determined whether an icon has been selected depending on whether a predetermined period of time elapses.

SUMMARY OF THE INVENTION

With an operation technique by which whether a user has operated an icon is determined only by simply detecting his/her line-of-sight position, it is difficult for an apparatus side to correctly determine whether the user has intentionally moved his/her line of sight or the user has unconsciously moved his/her eyes.

For example, as illustrated in FIG. 15, in a state in which a cancel icon 91 for a cancelation instruction and an OK (okay) icon 92 for an instruction for starting execution of a predetermined action are displayed on a display screen 90, a user directs his/her line of sight to the cancel icon 91 for a cancelation instruction. However, before a predetermined period of time elapses, the user's line of sight is unconsciously removed from the cancel icon 91 to be directed toward the OK icon 92, and after the line of sight has been directed toward the OK icon 92, a predetermined period of time elapses. Therefore, the apparatus side determines that the user has selected the OK icon 92, not the cancel icon 91, and execution of the predetermined action is started. That is, in a case in which the user keeps directing his/her line of sight to a certain region by unconsciously moving his/her eyes, not an intentional movement of the line of sight, an erroneous operation might possibly be performed.

In addition, in a case in which it is necessary to keep directing his/her line of sight to the same position, the user experiences a feeling of toughness. That is, the user is forced to carry a burden.

It is conceivable to employ a technique by which, not only the line-of-sight position is simply detected, but also another type of a detection method is combined, so as to be able to appropriately perform determination.

Examples include a method for recognizing an intended operation only in a case in which a user winks after gazing at an icon of an operation target, a method for recognizing an intended operation on the basis of the number of times of blinks, and a method for recognizing an intended operation by further using an audio input.

With the technique disclosed in JP2001-299691A, in a state in which a user keeps gazing at an icon a predetermined period of time, the user further needs to depress the foot switch and to audibly input the name of the icon. Thus, although an erroneous operation on the apparatus side is solved, a burden on the user side is heavy.

Also in the technique disclosed in JP2015-93147A, the user needs to perform an audible input.

In the technique disclosed in JP2012-128523A, in short, although it is determined whether an operation is intentional on the basis of the number of times of blinks, it is actually difficult to classify the blinks into unconscious ones or into conscious ones. For example, the number of times of blinks of a person in a nervous state may become ten times as large as that in a normal state and may differ depending on the scene even for the same user. That is, it is actually difficult to determine whether an operation is intentional, and thus, it might be possible to cause an erroneous operation.

In addition, in a case of the method for determining that an operation is intentional only when a user winks, since there are some people who are not good at winking, it is actually difficult to employ this method.

With the technique disclosed in JP2007-195892A, it is unlikely to produce an effect of enabling determination as to whether a movement of a line of sight is intended by the user.

The present invention has been made in view of such circumstances, and an object thereof is to provide a line-of-sight operation apparatus, a method, and a medical device by which it is possible to appropriately determine whether a movement of a line of sight is intended by a user and by which the user can be prevented from being forced to carry a burden.

In order to achieve the above object, a line-of-sight operation apparatus according to an aspect of the present invention includes a display screen, a display control unit that causes an icon having an animation image to be displayed on the display screen, a line-of-sight detection unit that detects a line of sight of a user, a following determination unit that determines, on the basis of a result of detection performed by the line-of-sight detection unit, whether a movement of the line of sight of the user follows a movement of the animation image, and an output unit that outputs information indicating that the icon has been selected in the case where the following determination unit determines that the movement of the line of sight of the user follows the movement of the animation image.

According to this aspect, it is possible to appropriately determine whether a movement of a line of sight is an operation intended by a user and to prevent the user from being forced to carry a burden.

In a line-of-sight operation apparatus according to another aspect of the present invention, the display control unit limits at least any one of the movement, a color, a shape, or a pattern of the animation image.

In a line-of-sight operation apparatus according to another aspect of the present invention, a surrounding characteristics acquisition unit that acquires, as display characteristics of a surrounding region, at least any one of a movement, a color, a shape, or a pattern in display of a surrounding region of the icon or a surrounding region of the animation image, and an animation image determination unit that obtains the display characteristics within a certain limitation based on the display characteristics of the surrounding region that have been acquired by the surrounding characteristics acquisition unit to determine display characteristics of the animation image are further included, and the display control unit sets the limitation by performing display control of the animation image on the basis of the display characteristics of the animation image determined by the animation image determination unit.

In a line-of-sight operation apparatus according to another aspect of the present invention, the display control unit differentiates the movement of the animation image in accordance with a selection timing of the icon or a display content on the display screen.

In a line-of-sight operation apparatus according to another aspect of the present invention, the display control unit differentiates the movement of the animation image in accordance with a usage of the icon.

In a line-of-sight operation apparatus according to another aspect of the present invention, the display control unit causes a plurality of icons to be displayed on the display screen and differentiates movements of animation images in the plurality of icons.

In a line-of-sight operation apparatus according to another aspect of the present invention, a difference in the movements of the animation images is at least one of a difference in loci of the movements or a difference in speeds of the movements.

In a line-of-sight operation apparatus according to another aspect of the present invention, a user characteristics measurement unit that measures characteristics of the movement of the line of sight of the user for each user, and a movement setting unit that sets the movement of the animation image on the basis of a result of the measurement performed by the user characteristics measurement unit for each user are further included.

In a line-of-sight operation apparatus according to another aspect of the present invention, the display control unit causes a plurality of icons to be displayed on the display screen, and the following determination unit differentiates a length of a time of period for detection of the movement of the line of sight between the plurality of icons in the following determination.

In a line-of-sight operation apparatus according to another aspect of the present invention, the display control unit causes a plurality of icons to be displayed on the display screen and causes the plurality of icons to be separated with each other by a certain distance or longer as displayed on the display screen.

In a line-of-sight operation apparatus according to another aspect of the present invention, the display control unit decreases visibility of a surrounding image, which is an image displayed around the icon, compared with visibility of the icon.

In a line-of-sight operation apparatus according to another aspect of the present invention, the display control unit causes a movement of a surrounding image, which is an image displayed around the icon, to be stopped.

In a line-of-sight operation apparatus according to another aspect of the present invention, the movement of the animation image is at least any one of a given rotation on the display screen, a movement on a line connecting two opposing sides on the display screen, a movement on a line connecting two opposing corners on the display screen, a given vibration on the display screen, a zigzag movement on the display screen, or a movement with a random locus.

A medical device according to an aspect of the present invention includes the above-described line-of-sight operation apparatus and performs a process for a medical service in accordance with information that is output from the output unit.

A line-of-sight operation method according to an aspect of the present invention includes a step of causing an icon having an animation image to be displayed on a display screen, a step of detecting a line of sight of a user, a step of determining, on the basis of a result of detection of the line of sight of the user, whether a movement of the line of sight of the user follows a movement of the animation image, and a step of outputting information indicating that the icon has been selected in the case where it is determined that the movement of the line of sight of the user follows the movement of the animation image.

According to the present invention, it is possible to appropriately determine whether a movement of a line of sight is intended by a user and to prevent the user from being forced to carry a burden.

DESCRIPTION OF THE PREFERRED EMBODIMENTS

Hereinafter, line-of-sight operation apparatuses and line-of-sight operation methods according to embodiments of the present invention will be described with reference to attached drawings.

First Embodiment

Figure 1:
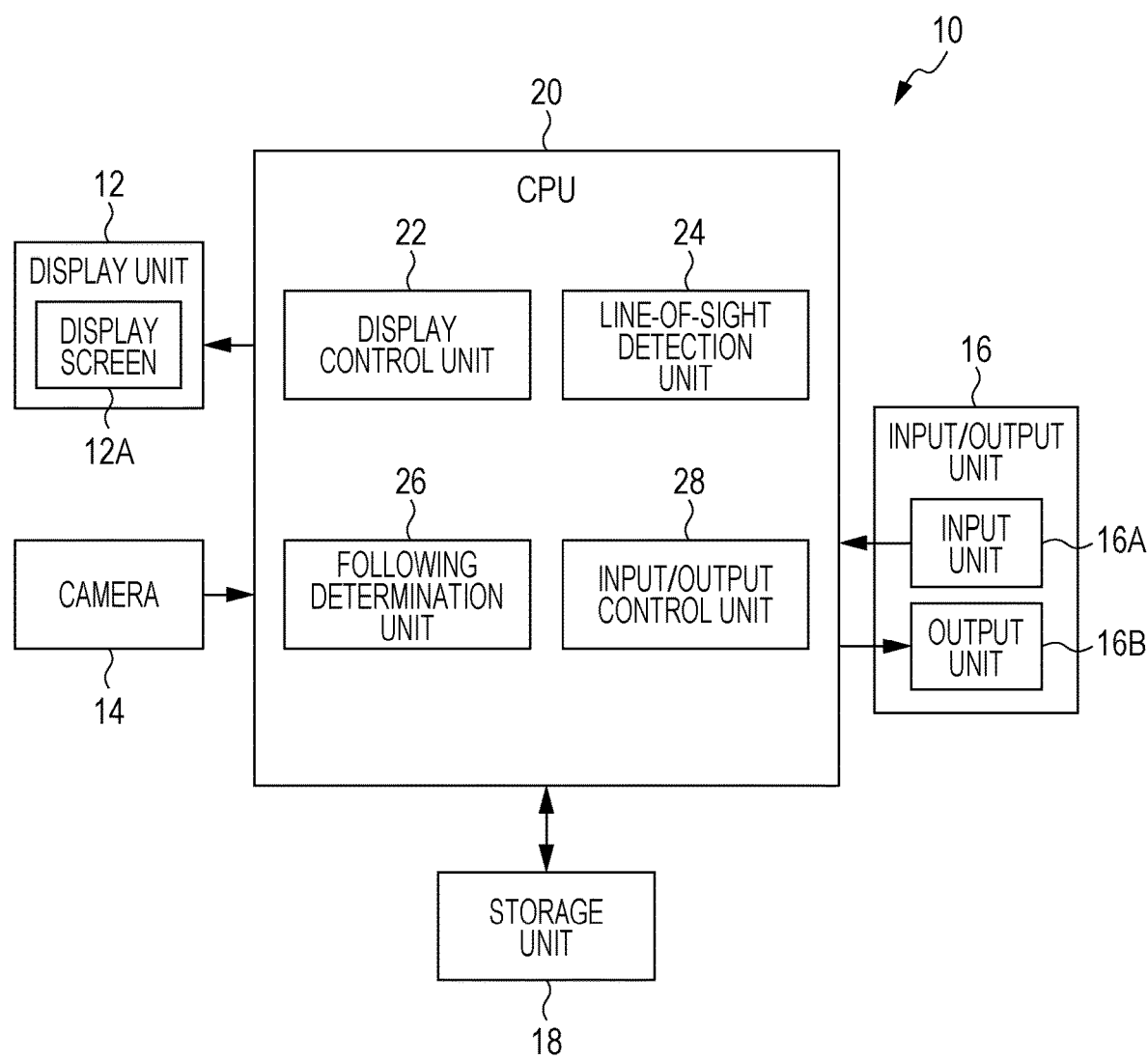
FIG. 1 is a block diagram illustrating a configuration example of a line-of-sight operation apparatus according to a first embodiment of the present invention.

FIG. 1 is a block diagram illustrating a configuration example of a line-of-sight operation apparatus 10 according to a first embodiment of the present invention.

The line-of-sight operation apparatus 10 according to this embodiment includes a display unit 12 having a display screen 12A, a camera 14 that captures an image of a user and that outputs the image of the user (hereinafter also referred to as "user image"), an input/output unit 16 having an input unit 16A for information (hereinafter also referred to as "information input unit") and an output unit 16B for information (hereinafter also referred to as "information output unit"), a storage unit 18 that stores a program for a line-of-sight operation and information that is necessary for executing the program, and a central processing unit (CPU) 20 that controls each unit of the line-of-sight operation apparatus 10 in accordance with the program that is stored in the storage unit 18.

The CPU 20 in this embodiment includes a display control unit 22, a line-of-sight detection unit 24, a following determination unit 26, and an input/output control unit 28. The display control unit 22 performs display control of the display unit 12 and causes an icon having an animation image to be displayed on the display screen 12A. The line-of-sight detection unit 24 detects a line of sight of the user. The following determination unit 26 determines, on the basis of a result of the detection performed by the line-of-sight detection unit 24, whether a movement of the line of sight of the user follows a movement of the animation image. The input/output control unit 28 controls information input to the input unit 16A and information output from the output unit 16B. In this example, in a case in which the following determination unit 26 determines that the movement of the line of sight of the user follows the movement of the animation image, in accordance with control performed by the input/output control unit 28, information indicating that the icon has been selected (hereinafter also referred to as "instructional information") is output from the output unit 16B.

The "icon" herein is a target of operation based on line-of-sight input and is represented by a shape, a pattern, a color, or a combination thereof. The "icon" herein is not limited to an icon having a square frame (icon typically called "button" or "switch"). The "icon" may be an icon consisting of a character font. That is, the "icon" may be only a picture forming a font.

Next, a specific example in which the display control unit 22 performs display control of the animation image will be described.

Figure 2:
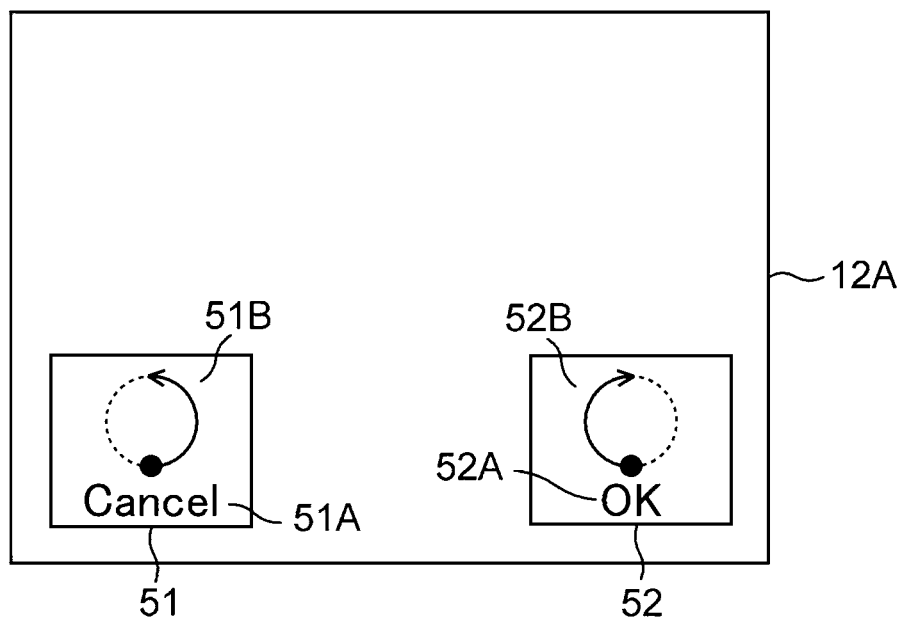
FIG. 2 is an explanation diagram illustrating an example in which a plurality of icons having animation images are displayed on a display screen.

FIG. 2 illustrates an example in which the display control unit 22 causes a first icon 51 and a second icon 52 to be displayed on the display screen 12A. The first icon 51 and the second icon 52 are configured to include, respectively, a font 51A and a font 52A that indicate the names of the icons, and an animation image 51B and an animation image 52B that have rotating movements on the plane of the display screen 12A. The first icon 51 is an icon displayed for inputting a cancelation instruction (hereinafter referred to as "cancel icon"). The second icon 52 is an icon displayed for inputting an instruction for starting execution of a predetermined action or for inputting confirmation of a displayed content on the display screen 12A (hereinafter referred to as "OK icon"). The first icon 51 has the animation image 51B having a counterclockwise rotation movement. The second icon 52 has the animation image 52B having a clockwise rotation movement. That is, the display control unit 22 performs display control such that the plurality of icons 51 and 52 are displayed on the display screen 12A and the plurality of icons 51 and 52 have different movements of the animation images 51B and 52B.

Note that although FIG. 2 illustrates a case in which the plurality of icons 51 and 52 are displayed on the display screen 12A, the present invention is also applicable to a case in which a single icon is displayed on the display screen 12A.

In addition, although a case in which the plurality of icons 51 and 52 have different loci of the movements of the animation images has been described with reference to FIG. 2, the present invention is not limited to such a case. The plurality of icons may have different speeds of the movements of the animation images. The plurality of icons may have both different loci of the movements and different speeds of the movements.

Figure 3:
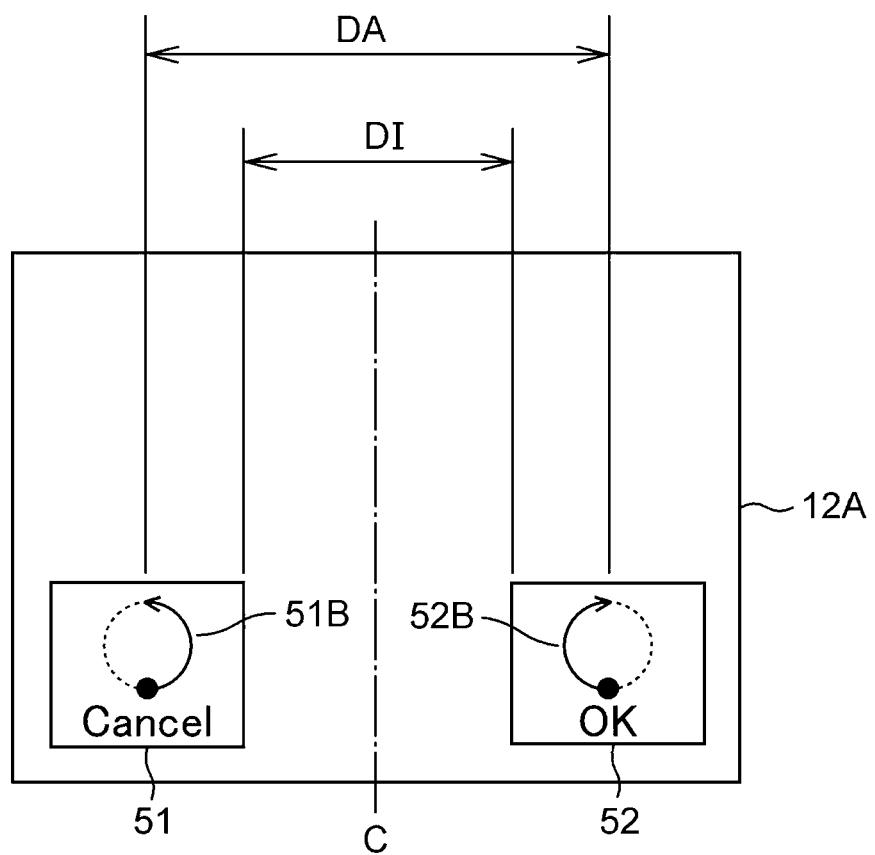
FIG. 3 is an explanation diagram used for description of disposition of icons and animation images on the display screen.

In addition, as illustrated in FIG. 3, the display control unit 22 causes the first icon 51 and the second icon 52 to be separated by a certain distance or longer as displayed on the display screen 12A. In FIG. 3, a distance DI from the first icon 51 to the second icon 52 (also referred to as "icon distance") is preferably large such that, in a case in which one of the icons, the icon 51 (or 52) is gazed at, the other of the icons, the icon 52 (or 51) is excluded from a line-of-sight position. The icon distance DI in this example is larger than the interval between the eyes of a normal person. A distance DA from the animation image 51B of the first icon 51 to the animation image 52B in the second icon 52 (also referred to as "animation image distance") may be the certain distance or longer.

Note that FIG. 3 illustrates an example in which the first icon 51 and the second icon 52 are disposed at the left side and the right side of the display screen 12A, respectively. However, in a case in which four icons are displayed, the icons are preferably displayed in the upper left corner, the lower left corner, the upper right corner, and the lower right corner of the display screen 12A, respectively. Here, "upper", "lower", "left", and "right" are based on the direction connecting the eyes of a person (horizontal direction). In the direction connecting the eyes of a person who faces the display screen 12A, the left-eye side corresponds to the left side, and the right-eye side corresponds to the right side.

The first icon 51 and the second icon 52 may be disposed on the upper side and the lower side of the display screen 12A, respectively. The first icon 51 and the second icon 52 may be disposed in the upper left corner and the lower right corner (or the upper right corner and the lower left corner) of the display screen 12A, respectively.

Next, a specific example of line-of-sight detection performed by the line-of-sight detection unit 24 will be described.

The line-of-sight detection unit 24 in this example extracts, from a user image obtained by image capturing of a user performed by the camera 14, a stationary portion in the eyes and a dynamic portion in the eyes. On the basis of the position of the stationary portion in the eyes, the line-of-sight detection unit 24 detects the position of the dynamic portion in the eyes, and, on the basis of the detected position of the dynamic portion in the eyes, calculates the line-of-sight position on the display screen 12A. The line-of-sight detection unit 24 may detect the locus of the movement of the line-of-sight position.

Figure 4:
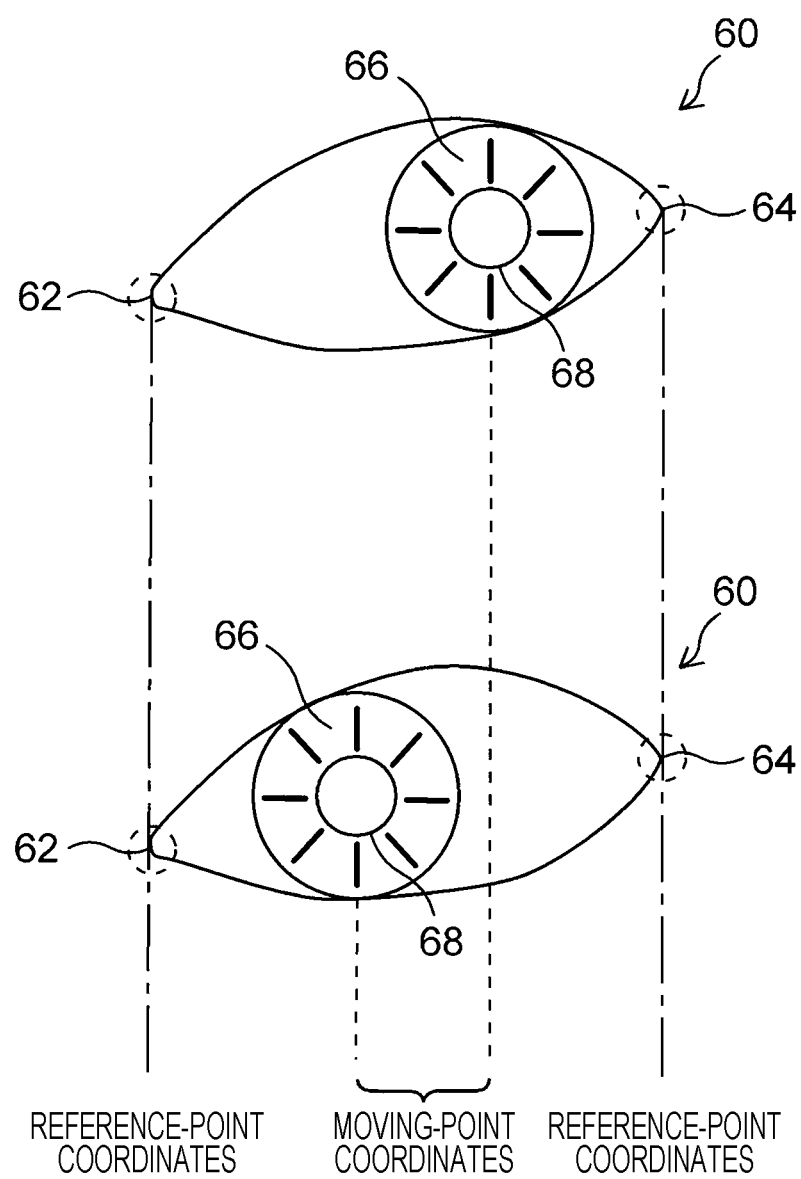
FIG. 4 is an explanation diagram used for description of an example of detection of a line of sight.

With reference to FIG. 4, an example of detecting a line of sight by detecting a movement of the iris of an eye by using a visible-light image capturing apparatus as the camera 14 will be described. The line-of-sight detection unit 24 extracts an inner corner portion 62 of the eye and/or an outer corner portion 64 of the eye as a reference point from a user image 60 to calculate reference-point coordinates, extracts an iris portion 66 as a moving point from the user image 60 to calculate moving-point coordinates, and, on the basis of a positional relationship of the moving-point coordinates with respect to the reference-point coordinates, calculates the line-of-sight position of the user.

The line of sight may be detected by using, as the camera 14, an image capturing apparatus that emits infrared rays to capture an image and on the basis of a relationship between a reflection position on the cornea of the user's eye and the position of the pupil. The line-of-sight detection unit 24 extracts a reflection from the cornea as a reference point from the user image 60 to calculate reference-point coordinates, extracts a pupil portion (68 in FIG. 4) as a moving point from the user image 60 to calculate moving-point coordinates, and calculates the line-of-sight position of the user from a positional relationship of the moving-point coordinates with respect to the reference-point coordinates. Although this line-of-sight detection using infrared rays needs a device that is capable of emitting infrared rays and capturing images, typically, the detection accuracy of the line-of-sight position is likely to be increased.

Note that the detection of the line of sight in the present invention is not limited to the case described with reference to FIG. 4. As long as the line of sight of the user can be detected, any other known technique can be used for the detection of the line of sight. Note that a line-of-sight detection technique is used by which the accuracy of the line-of-sight position is ensured such that it is possible to determine whether the line of sight is directed to an animation image.

Next, following determination performed by the following determination unit 26 will be described.

The following determination unit 26 in this example compares a movement vector of the line-of-sight position on the display screen 12A with a movement vector of the animation image so as to determine whether the movement of the line of sight of the user follows the movement of the animation image. The "movement vector" indicates a movement direction and a movement amount. The following determination unit 26 in this example calculates, as a following level, the reciprocal of the difference between an evaluation value of the movement direction and the movement amount of the line-of-sight position and an evaluation value of the movement direction and the movement amount of the animation image, and determines that the movement of the line of sight of the user "does not follow" the movement of the animation image in a case in which the following level is lower than a threshold value, and determines that the movement of the line of sight of the user "follows" the movement of the animation image in a case in which the following level is higher than or equal to the threshold value.

The input/output unit 16 controlled by the input/output control unit 28 is not limited to a special hardware device such as a communication unit. The input/output unit 16 may be a simple output port. In addition, the input/output unit 16 may write instructional information in a storage device such as a memory.

In addition, as an aspect of information output, although a case in which the output unit 16B outputs information has been described as an example, another aspect of output may be used. For example, the display control unit 22 may cause the display of an icon on the display screen 12A to be reversed (e.g., white and black are reversed in a case of monochrome display) so as to output information indicating that the icon has been selected. In addition, the display control unit 22 may display characters around an icon on the display screen 12A (e.g., display "select") so as to output information indicating that the icon has been selected. That is, the display unit 12 may be used as the "output unit". In addition, there are no limitations to the above-described "reversing the display of an icon" and "displaying characters around an icon", and any display is possible as long as it is indicated that an icon has been operated or selected. Note that "an icon has been selected" herein is a concept including a case in which phrases such as "an instruction has been issued for an icon", "an icon has been specified", and "an icon has been operated" are used for expression.

Figure 5:
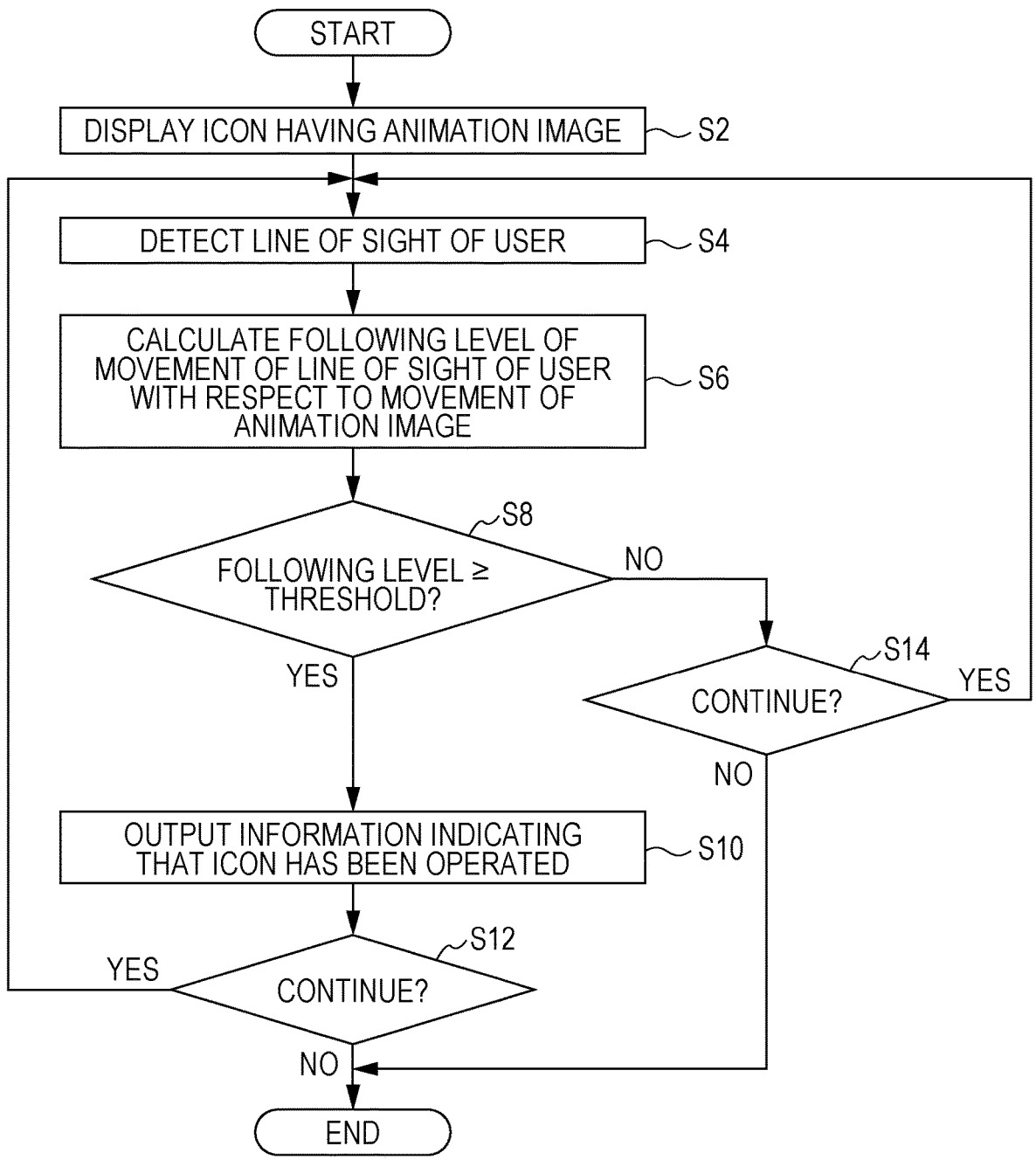
FIG. 5 is a flowchart illustrating a process flow of an example of a line-of-sight operation method using the line-of-sight operation apparatus according to the first embodiment.

FIG. 5 is a flowchart illustrating a process flow of an example of a line-of-sight operation method using the line-of-sight operation apparatus according to the first embodiment. This process is executed by the CPU 20 in accordance with a program that is stored in the storage unit 18 in advance.

First, the display control unit 22 causes an icon having an animation image to be displayed on the display screen 12A of the display unit 12 (step S2). For example, as illustrated in FIG. 2, the icons 51 and 52 having the animation images 51B and 52B are displayed.

Subsequently, the line-of-sight detection unit 24 detects the line of sight of a user so as to calculate the position to which the line of sight of the user is directed (line-of-sight position) on the display screen 12A of the display unit 12 (step S4). For example, by using the line-of-sight detection technique described with reference to FIG. 4, the line-of-sight position is calculated on the basis of a user image captured by the camera 14.

Subsequently, on the basis of the result of the line-of-sight detection performed by the line-of-sight detection unit 24, the following determination unit 26 calculates a following level, which is an evaluation value indicating how much the movement of the line of sight of the user follows the movement of the animation image 51B or 52B in the icon 51 or 52 displayed on the display screen 12A of the display unit 12 (step S6). For example, the following determination unit 26 calculates, as the following level, the reciprocal of the difference between an evaluation value corresponding to movement vector of the animation image 51B or 52B and an evaluation value corresponding to the movement vector of the line-of-sight position. In this case, as the calculated following level is higher, it is more likely that the movement of the line of sight of the user follows the movement of the animation image 51B or 52B.

Subsequently, the following determination unit 26 compares the calculated following level with a threshold value so as to determine whether the movement of the line of sight of the user follows the movement of the animation image (step S8). In this example, since it is more likely that the movement of the line of sight of the user follows the movement of the animation image as the calculated following level is higher, if the following level is higher than or equal to the threshold value, it is determined that the movement of the line of sight of the user "follows" the movement of the animation image.

If it is determined that the movement of the line of sight of the user follows the movement of the animation image (YES in step S8), the input/output control unit 28 outputs, from the output unit 16B, instructional information indicating that the icon has been operated (step S10). It is determined whether the line-of-sight detection is to be continued (step S12), and if the line-of-sight detection is to be continued (YES in step S12), the process returns to step S4, and if the line-of-sight detection is not to be continued (NO in step S12), the process ends.

If it is determined that the movement of the line of sight of the user does not follow the movement of the animation image (NO in step S8), it is determined whether the line-of-sight detection is to be continued (step S14). If the line-of-sight detection is to be continued (YES in step S14), the process returns to step S4, and if the line-of-sight detection is not to be continued (NO in step S14), the process ends.

Figure 6:
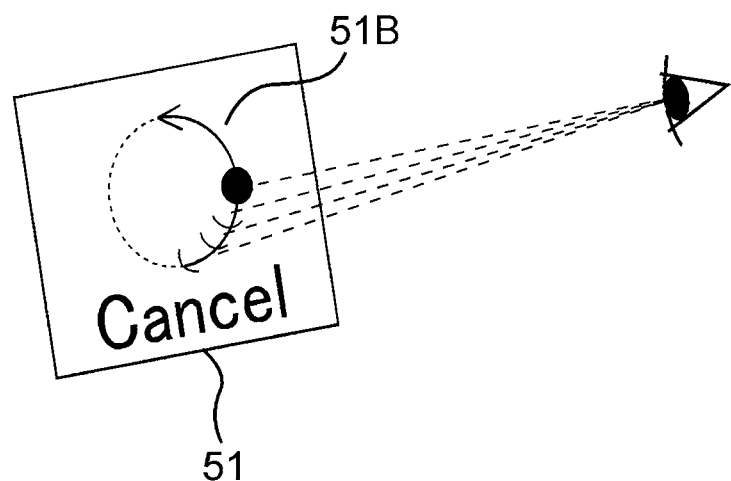
FIG. 6 is an explanation diagram used for description of how much a movement of a line-of-sight position of a user follows a movement of an animation image.

With the line-of-sight operation apparatus 10 according to this embodiment, as illustrated in FIG. 6, the user can perform a line-of-sight input operation by following, with his/her eyes, the movement of the animation image 51B in the icon 51, and thus, the burden is small. That is, to gaze at something moving is easy compared with an operation of manual input, foot input, audible input, or gesture. In addition, the user is not interrupted from observing the display on the display screen 12A. Furthermore, the user does not experience a feeling of low responsiveness, delay, or the like and is less stressed compared with a line-of-sight operation method in which the user has to keep gazing at the same position until a predetermined period of time elapses.

Animation Variations

Although an example of a rotating animation has been described as an example with reference to FIG. 2, the present invention is not limited to such a case. For example, the following Variations 1 to 4 may be employed.

Animation Variation 1

Figure 7A:
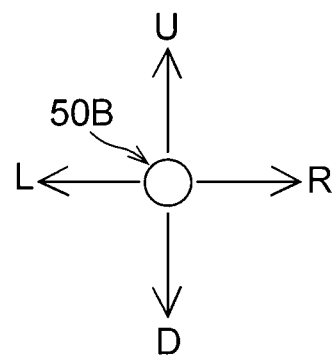
FIGS. 7A, 7B, 7C, and 7D are explanation diagrams used for description of variations of movements of animation images.

As illustrated in FIG. 7A, an animation image 50B in an icon can have a movement in an up direction U, a down direction D, a left direction L, or a right direction R on the plane of the display screen 12A. That is, a movement (animation) on a line connecting two opposing sides of the display screen 12A is used.

Animation Variation 2

Figure 7B:
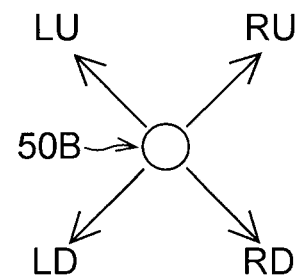

As illustrated in FIG. 7B, the animation image 50B in an icon can have a movement in an upper right oblique direction RU, a lower right oblique direction RD, an upper left oblique direction LU, or a lower left oblique direction LD on the plane of the display screen 12A. That is, a movement (animation) on a line connecting two opposing corners of the display screen 12A is used. Note that the "line connecting two opposing corners" is not limited to a case in which two opposing corners are located on a line, but includes a case in which two opposing corners are located near a line.

Animation Variation 3

Figure 7C:
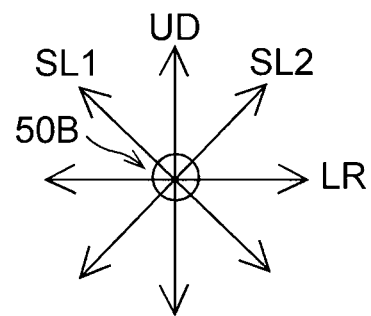

As illustrated in FIG. 7C, the animation image 50B in an icon can have a vibrating movement in an up-down direction UD, a left-right direction LR, or an oblique direction SL1 or SL2 on the plane of the display screen 12A. That is, given vibrations on the display screen 12A are used as an animation.

Animation Variation 4

Figure 7D:
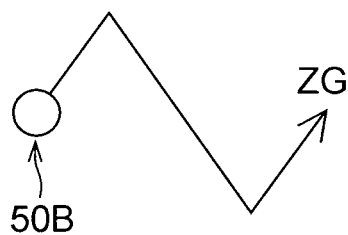

As illustrated in FIG. 7D, the animation image 50B in an icon can have a zigzag ZG movement on the plane of the display screen 12A.

Note that the animation variations in the present invention are not particularly limited to the above-described Variations 1 to 4. A movement with a random locus may be used as an animation. In addition, any variation may be combined so as to increase the detection accuracy of a line-of-sight operation. The animation may be any movement that triggers a movement of a user's line-of-sight position on the plane of the display screen 12A, that is, a movement on the plane of a display screen 12A.

Increase Visibility of Icon

The display control unit 22 may decrease the visibility of a surrounding image, which is an image displayed in a surrounding region of an icon, compared with the visibility of the icon. For example, the brightness of the surrounding image is made lower (i.e., darker) than that of the icon or the animation image.

Note that the "visibility" herein is not limited only to the brightness. For example, the visibility may be made lower by using a halftone. In short, at an icon selecting timing (hereinafter also referred to as "operation timing"), the animation image or the icon is made more outstanding than the surrounding image so that a user can direct his/her line of sight to the animation image or the icon more easily than to the surrounding image.

In addition, while the icon is displayed, the display control unit 22 may stop the movement of the surrounding image, which is an image displayed around the icon.

Second Embodiment

In a second embodiment, display characteristics (e.g., a movement, a color, a shape, and a pattern) of an animation image are limited so that a user can be prevented from unintentionally moving his/her line of sight against a person's habit of following something moving with his/her eyes.

Figure 8:
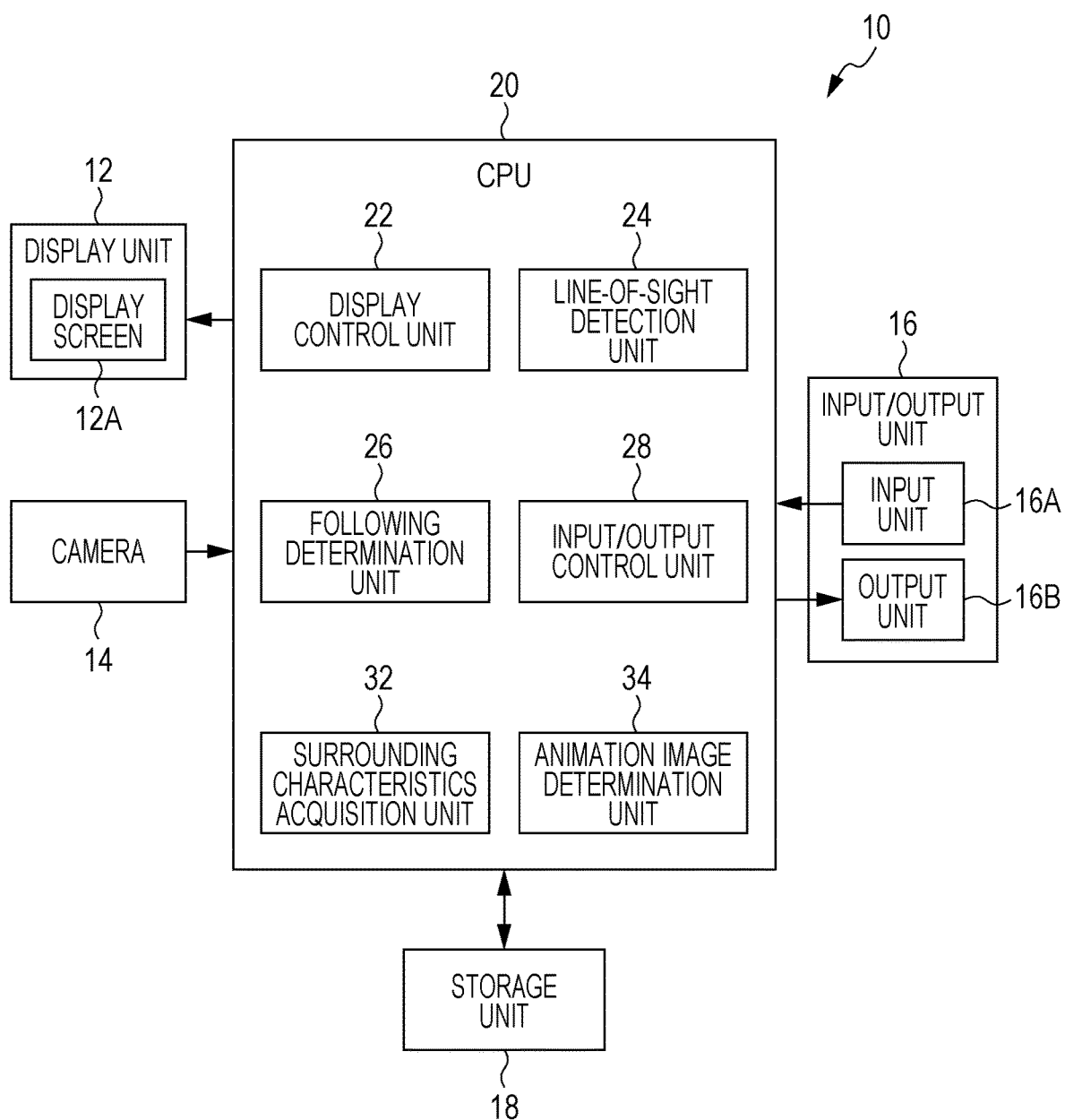
FIG. 8 is a block diagram illustrating a configuration example of the line-of-sight operation apparatus according to a second embodiment of the present invention.

FIG. 8 is a block diagram illustrating a configuration example of the line-of-sight operation apparatus 10 according to the second embodiment of the present invention. Note that the same components as those of the line-of-sight operation apparatus 10 according to the first embodiment illustrated in FIG. 1 are denoted by the same reference numerals, and contents that have been described above will be omitted from the following description.

As illustrated in FIG. 8, the line-of-sight operation apparatus 10 according to this embodiment includes a surrounding characteristics acquisition unit 32 and an animation image determination unit 34. The surrounding characteristics acquisition unit 32 acquires at least any one of a movement, a color, a shape, or a pattern in the display of a surrounding region of an icon (or a surrounding region of an animation image) on the display screen 12A as display characteristics of the surrounding region (hereinafter referred to as "surrounding region display characteristics"). The animation image determination unit 34 obtains display characteristics within a certain limitation based on the surrounding region display characteristics acquired by the surrounding characteristics acquisition unit 32 so as to determine display characteristics of the animation image (hereinafter referred to as "animation image display characteristics"). The display control unit 22 in this embodiment performs display control of the animation image on the basis of the animation image display characteristics determined by the animation image determination unit 34 so as to limit the animation image display characteristics (at least any one of a movement, a color, a shape, or a pattern).

As specific examples of aspects in which the surrounding characteristics acquisition unit 32 acquires the surrounding region display characteristics, the following first acquisition aspect and second acquisition aspect can be given.

First Acquisition Aspect

An image of a surrounding region is extracted from information indicating an image to be displayed on the whole display screen 12A (hereinafter referred to as "screen information"), and the surrounding region display characteristics are calculated on the basis of the image of the surrounding region. Thus, the surrounding region display characteristics are acquired.

Second Acquisition Aspect

Display characteristics information indicating a correspondence relationship between the icon (or the animation image) and the surrounding region display characteristics is stored in the storage unit 18 in advance, and the display characteristics information is read out from the storage unit 18. Thus, the surrounding region display characteristics are acquired.

The "limitation" of the animation image display characteristics performed by the display control unit 22 herein means to set the display characteristics of the animation image within the certain limitation.

The "certain limitation" may be a case in which a limitation is provided by setting an evaluation value of the display characteristics of the animation image to a smaller value than that at a normal state or may be a case in which a limitation is provided by setting the evaluation value of the display characteristics of the animation image to a larger value than that at the normal state. For example, the characteristics of the animation image may be decreased compared with those at the normal state so as not to generate a color that draws a user's attention or a showy movement. In addition, for example, a zigzag movement or a movement with a random locus may be intentionally added to the animation image, that is, the characteristics of the animation image may be intentionally increased compared with those at the normal state so that the user's eyes can easily follow only the movement of the animation image.

In addition, the "certain limitation" may be a fixed limitation or a variable limitation in accordance with an operation scene. For example, the storage unit 18 may store fixed limitation information, and the fixed limitation information stored in the storage unit 18 is read out to be used. In addition, for example, the limitation may be switched in accordance with the operation scene (e.g., the icon operation timing or contents on the display screen 12A).

Figure 9:
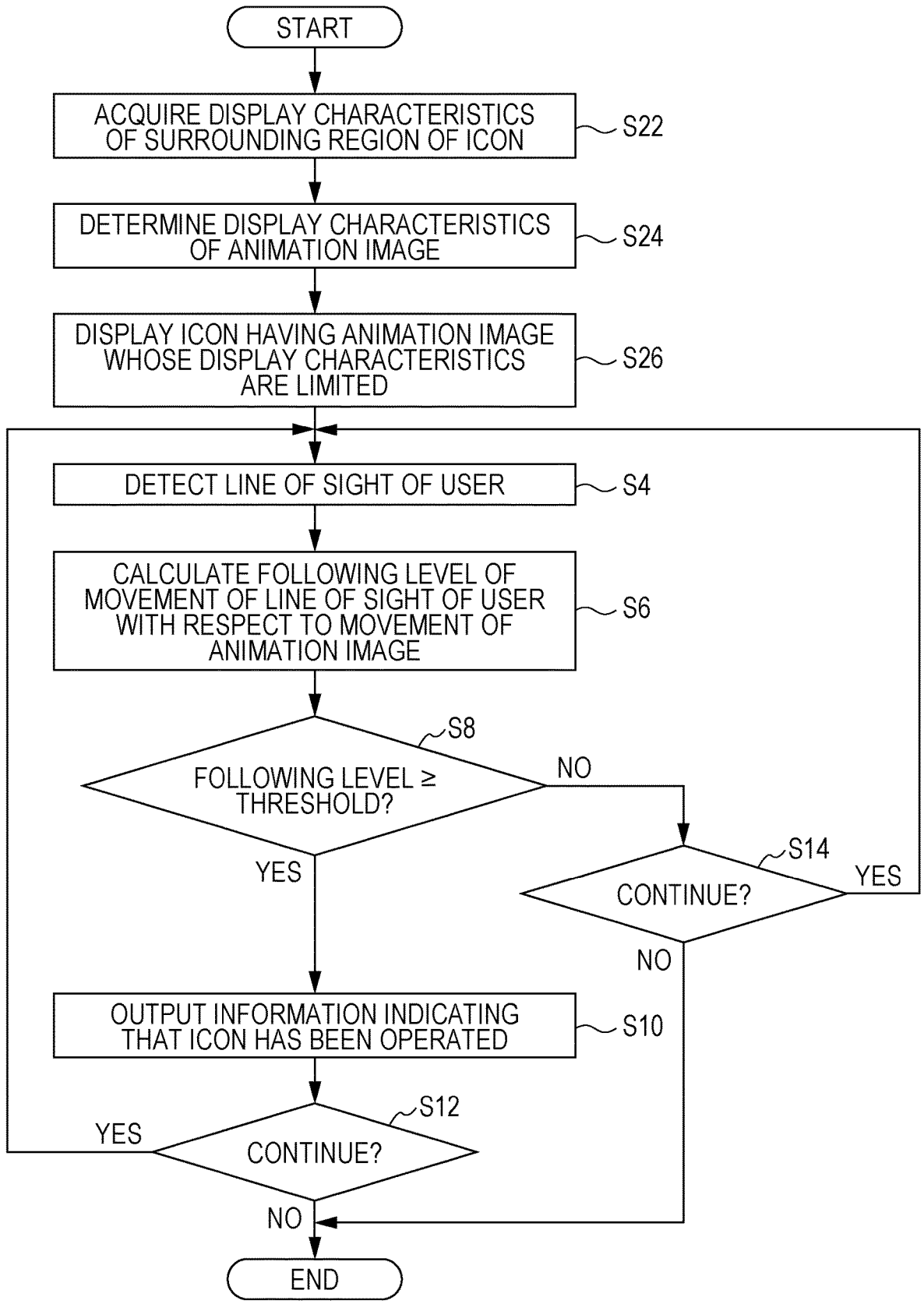
FIG. 9 is a flowchart illustrating a process flow of an example of a line-of-sight operation method using the line-of-sight operation apparatus according to the second embodiment.

FIG. 9 is a flowchart illustrating a process flow of an example of a line-of-sight operation method using the line-of-sight operation apparatus 10 according to the second embodiment. This process is executed by the CPU 20 in accordance with a program that is stored in the storage unit 18 in advance. Note that the same steps as those in the process according to the first embodiment illustrated in FIG. 5 are denoted by the same reference numerals, and only different matters will be described below.

First, the surrounding characteristics acquisition unit 32 acquires the surrounding region display characteristics (e.g., at least any one of a movement, a color, a shape, or a pattern) indicating the display characteristics of the surrounding region of the icon (or the surrounding region of the animation image) on the display screen 12A (step S22).

For example, an image of the surrounding region is extracted from the screen information of the display screen 12A, and an evaluation value of the color of the image of the surrounding region (e.g., average value of the color of the surrounding region) is acquired as the surrounding region display characteristics.

Subsequently, the animation image determination unit 34 obtains the display characteristics within the certain limitation based on the surrounding region display characteristics acquired in step S22 so as to determine the animation image display characteristics indicating the display characteristics of the animation image (step S24).

For example, a color that is present at a distance larger than a first threshold value and smaller than a second threshold (>first threshold value) in a color coordinate system space with the evaluation value of the color of the surrounding region acquired in step S22 located at the center is selected so as to determine the animation image display characteristics (the color of the animation image in this example).

Subsequently, the display control unit 22 performs display control of the animation image on the basis of the animation image display characteristics determined in step S24 so as to limit the display characteristics of the animation image (e.g., at least any one of a movement, a color, a shape, or a pattern) within the certain limitation (step S26).

For example, display control is performed so as to display the animation image in the color selected from the color coordinate system space in step S24.

Steps S4 to S14 are the same as those denoted by the same reference numerals in the first embodiment illustrated in FIG. 5, and description thereof will be omitted here.

Note that although a case in which the limitation target of the display characteristics of the icon image is the color has been described above as an example with reference to FIG. 9, the limitation target in this embodiment is not limited to the color. The shape, the pattern, or the movement of the animation image may be limited, and other display characteristics may be limited. In addition, a combination of a plurality of display characteristics selected from the color, the shape, the pattern, and the movement may be limited, and other combinations may be limited.

In addition, although a case in which the target for which the surrounding region display characteristics are acquired and the limitation target of the display characteristics of the icon image are the color has been described above as an example with reference to FIG. 9, the target for which the surrounding region display characteristics are acquired and the limitation target of the display characteristics of the icon image may be different from each other. For example, the pattern of the surrounding region may be acquired, and on the basis of the pattern of the surrounding region (e.g., oblique line pattern), the animation may be limited to a locus of a certain pattern (e.g., movements in oblique directions may be removed), as an example of a useful aspect of limitation.

Third Embodiment

In a third embodiment, in order to prevent erroneous operations and to smoothly perform operations, a movement of an animation image is controlled. That is, the display control unit 22 in this embodiment differentiates an animation between a case in which it is important to prevent erroneous operations and a case in which smooth operations are required compared with the prevention of erroneous operations, so as to achieve both the prevention of erroneous operations and smooth operations.

Figure 10:
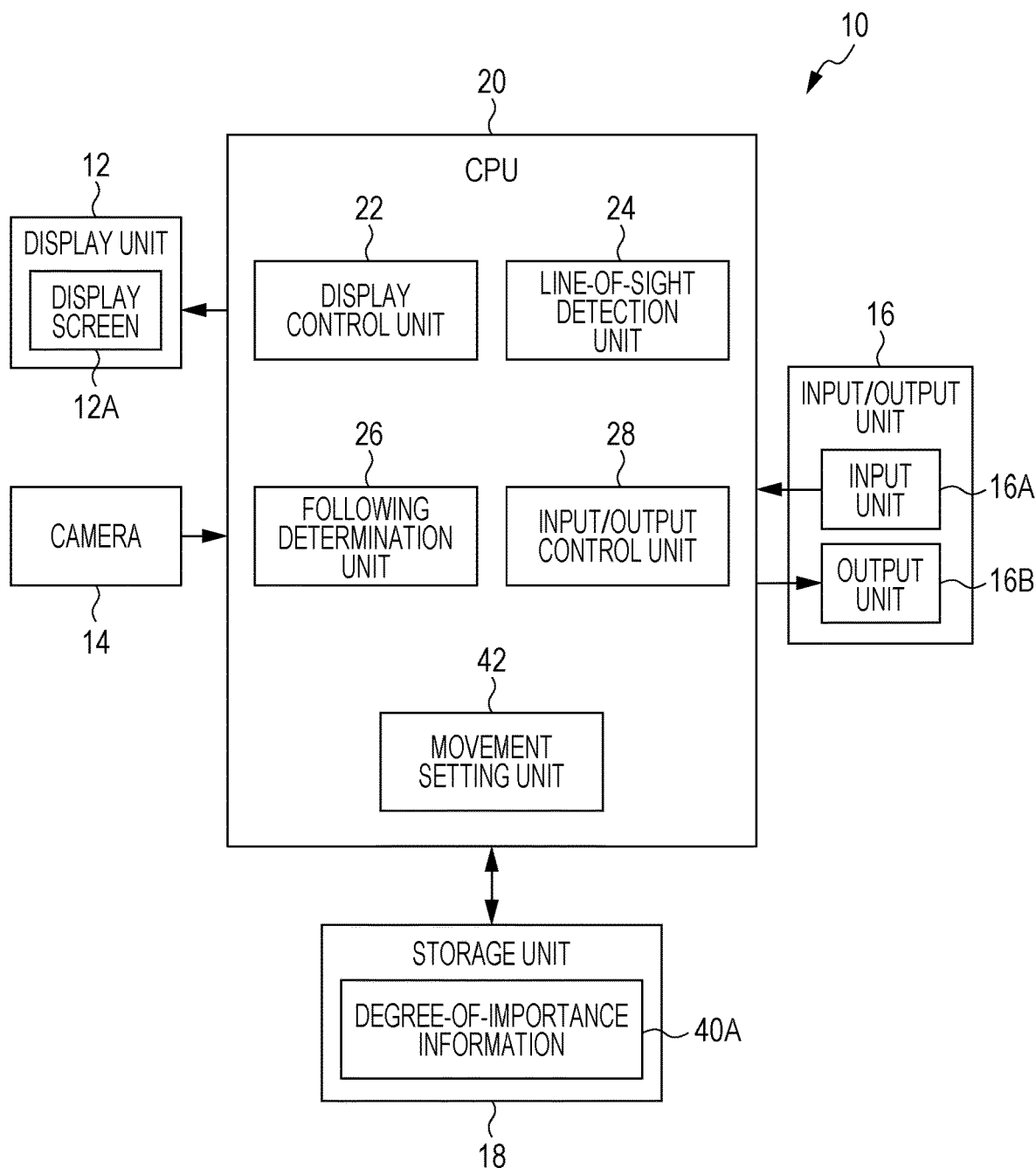
FIG. 10 is a block diagram illustrating a first configuration example of the line-of-sight operation apparatus according to a third embodiment of the present invention.

FIG. 10 is a block diagram illustrating a first configuration example of the line-of-sight operation apparatus 10 according to the third embodiment of the present invention. Note that the same components as those of the line-of-sight operation apparatus 10 according to the first embodiment illustrated in FIG. 1 are denoted by the same reference numerals, and contents that have been described above will be omitted from the following description.

As illustrated in FIG. 10, the storage unit 18 of the line-of-sight operation apparatus 10 according to this embodiment stores degree-of-importance information 40A indicating a degree of importance of an operation. A movement setting unit 42 sets the movement of the animation image on the display screen 12A on the basis of the degree-of-importance information 40A stored in the storage unit 18. The display control unit 22 differentiates the movement of the animation image in an icon in accordance with the degree of importance on the basis of the setting content of the movement setting unit 42.

Specific examples of the above-described "degree of importance of an operation" include the following Degrees of Importance 1 to 3.

Degree of Importance 1

This is the degree of importance corresponding to the icon selecting timing (operation timing). For example, input of an instruction at the time of final determination has a higher degree of importance than input of an instruction at a normal state before the final determination. In a case in which the cancel icon 51 and the OK icon 52 illustrated in FIG. 2 are displayed on the display screen 12A, the storage unit 18 stores a correspondence relationship between the operation timing of the icons 51 and 52 and the degree of importance. On the basis of the degree-of-importance information 40A, the display control unit 22 acquires the degree of importance corresponding to the operation timing of the icons 51 and 52. For example, as the degree of importance corresponding to the operation timing is higher, the display control unit 22 moves the animation image more slowly. That is, as the degree of importance corresponding to the operation timing is higher, the speed of the animation is decreased. As the degree of importance corresponding to the operation timing is higher, the animation image may have a more complex locus of movement.

Degree of Importance 2

This is the degree of importance corresponding to the display content. For example, in a case in which a warning message for a user is displayed on the display screen 12A, the degree of importance is increased compared with a case in which a normal message other than a warning message is displayed. The storage unit 18 stores a correspondence relationship between the display content on the display screen 12A and the degree of importance. On the basis of the degree-of-importance information 40A, the display control unit 22 acquires the degree of importance corresponding to the display content on the display screen 12A. For example, as the degree of importance corresponding to the display content is higher, the display control unit 22 moves the animation image more slowly. That is, as the degree of importance corresponding to the display content is higher, the speed of the animation is decreased. As the degree of importance corresponding to the display content is higher, the animation image may have a more complex locus of movement.

Degree of Importance 3

This is the degree of importance corresponding to the usage of the icon. For example, a delete icon for inputting an instruction for "deleting" information has a higher degree of importance than a copy icon for inputting an instruction for "copying" information. The storage unit 18 stores a correspondence relationship between the usage (or identification information) of the icons 51 and 52 and the degree of importance. On the basis of the degree-of-importance information 40A, the display control unit 22 acquires the degree of importance corresponding to the usage (or identification information) of the icons 51 and 52. For example, as the degree of importance is higher, the display control unit 22 moves the animation image more slowly. That is, as the degree of importance corresponding to the usage of the icon is higher, the speed of the animation is decreased. As the degree of importance corresponding to the usage of the icon is higher, the animation image may have a more complicated locus of movement. Here, the "usage of the icon" means an action executed when the icon is operated by line-of-sight input. The "usage of the icon" may be displayed on the display screen 12A as the name of the icon.

The "degree-of-importance information" is, for example, a larger numeric value as the degree of importance is higher. In contrast, the "degree-of-importance information" may be a smaller numeric value as the degree of importance is lower. That is, the "degree-of-importance information" in this embodiment may mean a degree of normality (degree of unimportance). In addition, it is possible to employ a "degree of smoothness" indicating the smoothness that is required for line-of-sight input. Regardless of the index name to be used, the design can be changed without departing from the spirit of this embodiment.

Although a case in which the animation is controlled to be differentiated on the basis of the degree-of-importance information 40A has been described with reference to FIG. 10, the present invention is not limited to such a case.

Figure 11:
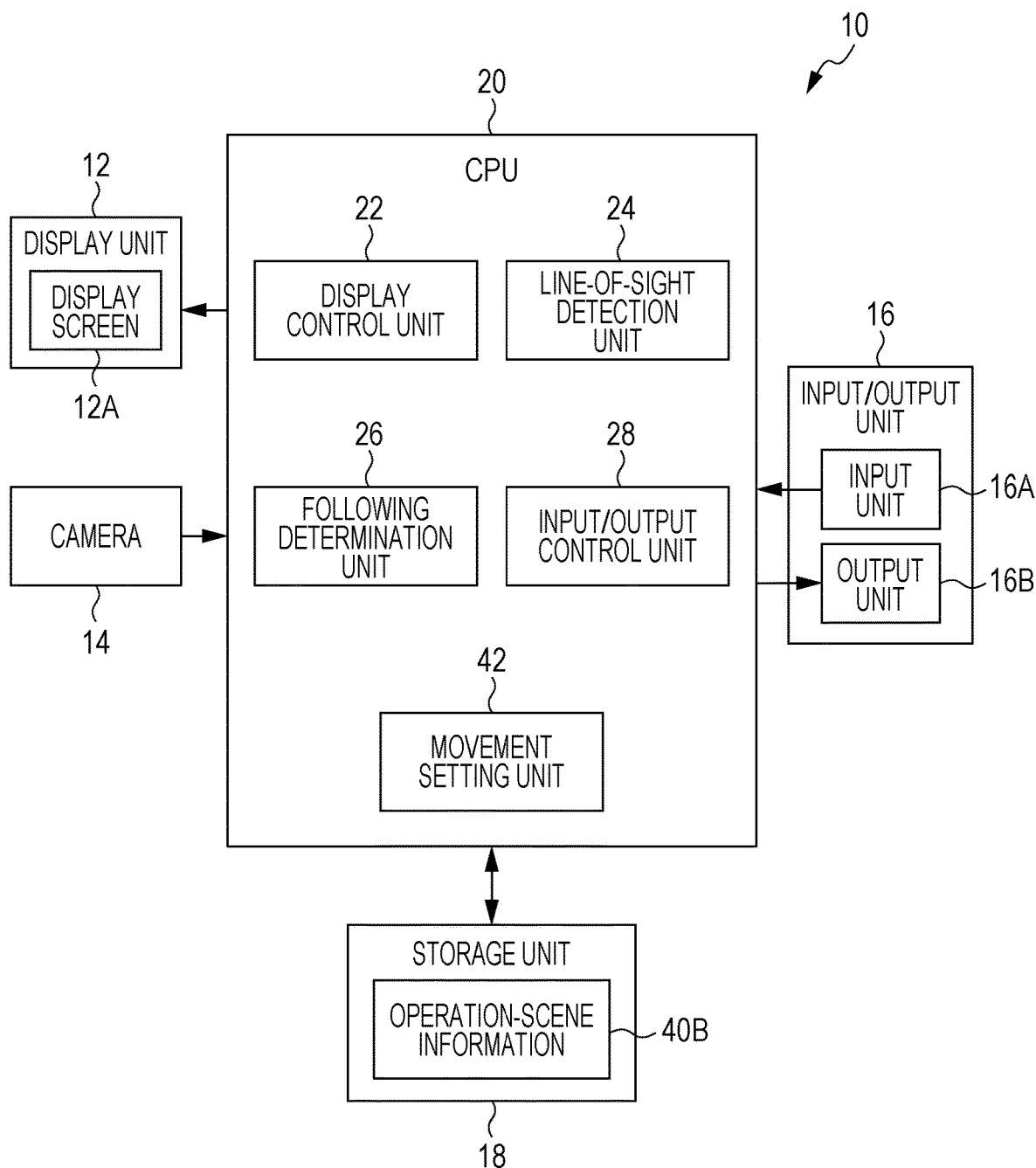
FIG. 11 is a block diagram illustrating a second configuration example of the line-of-sight operation apparatus according to the third embodiment of the present invention.

For example, as illustrated in FIG. 11, the storage unit 18 may store operation-scene information 40B indicating a direct correspondence relationship between an operation scene (specifically, the icon operation timing and/or the display content on the display screen 12A) and the movement of the animation image, and the display control unit 22 may be configured to control the movement of the animation image on the basis of the operation-scene information 40B.

Figure 12:
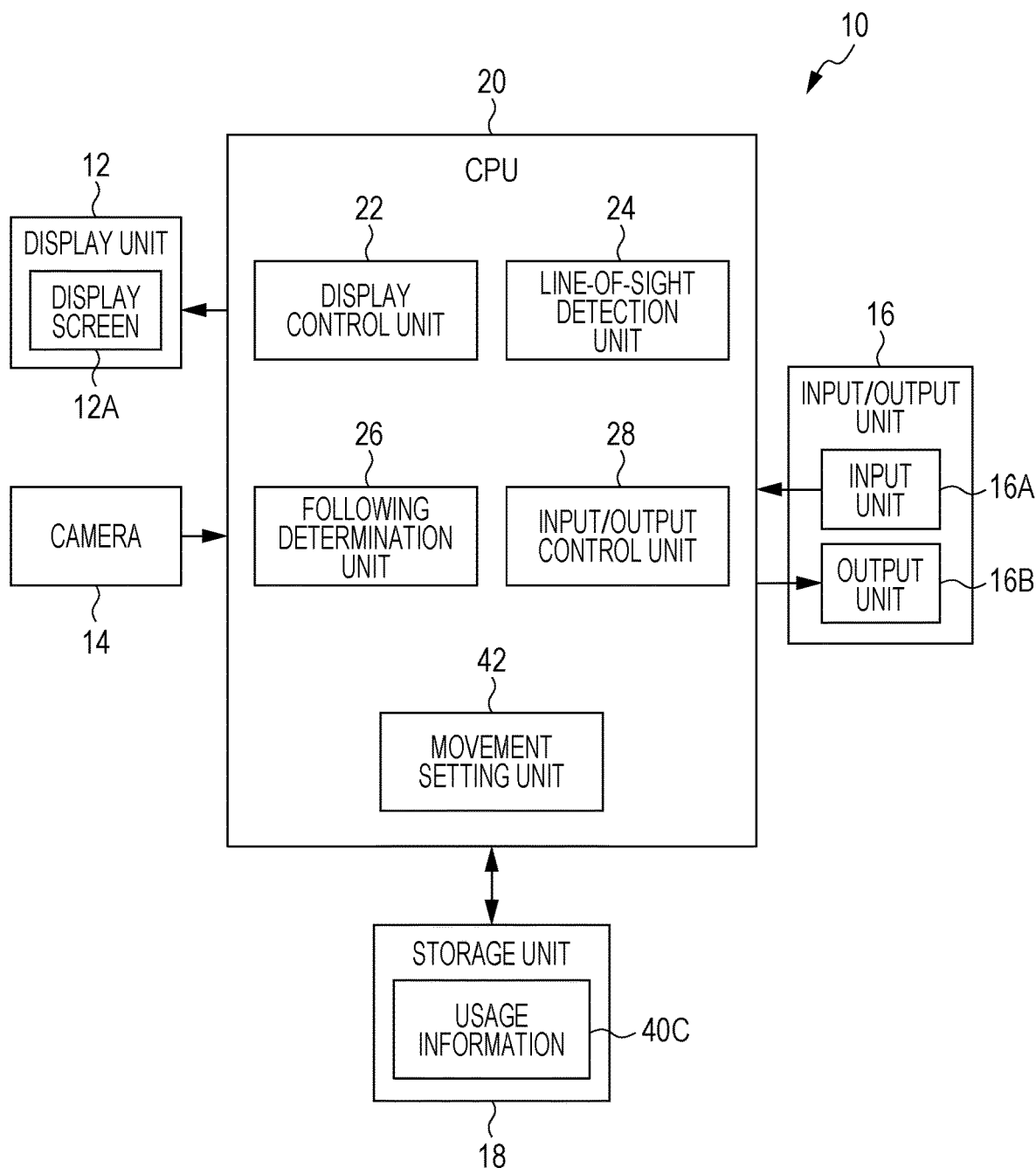
FIG. 12 is a block diagram illustrating a third configuration example of the line-of-sight operation apparatus according to the third embodiment of the present invention.

In addition, as illustrated in FIG. 12, the storage unit 18 may store usage information 40C indicating a direct correspondence relationship between the usage (or identification information) of the icon and the movement of the animation image, and the display control unit 22 may be configured to control the movement of the animation image on the basis of the usage information 40C.

Although a case in which the display control unit 22 controls the movement of the animation image in accordance with the icon selecting timing (operation timing), the display content on the display screen, or the usage of the icon has been described above, the present invention may be implemented by combining these. For example, in a case in which a display content with a high degree of importance and two icons for different usages are displayed on the display screen 12A, animation images of the two icons are moved more slowly than those in a case in which a normal display content is displayed, and further, the complexes of the movements of the animation images of the two icons are differentiated in accordance with the usages of the icons.

In addition, the plurality of icons may have different lengths of periods of time for detecting the movement of the line of sight in the following determination performed by the following determination unit 26. For example, in a case in which two icons are displayed on a display screen 12A, the period of time for detecting the movement of the line of sight toward an icon with the relatively higher degree of importance of the two icons is made relatively longer.

In addition, although a case in which the plurality of icons are displayed on the display screen 12A has been described with reference to FIG. 2, this embodiment is also useful in a case in which only a single icon is displayed on the display screen 12A.

Fourth Embodiment

In a fourth embodiment, the movement of the animation image is controlled in accordance with characteristics of the movement of the line of sight of the user (hereinafter referred to as "user characteristics") for each user.

Figure 13:
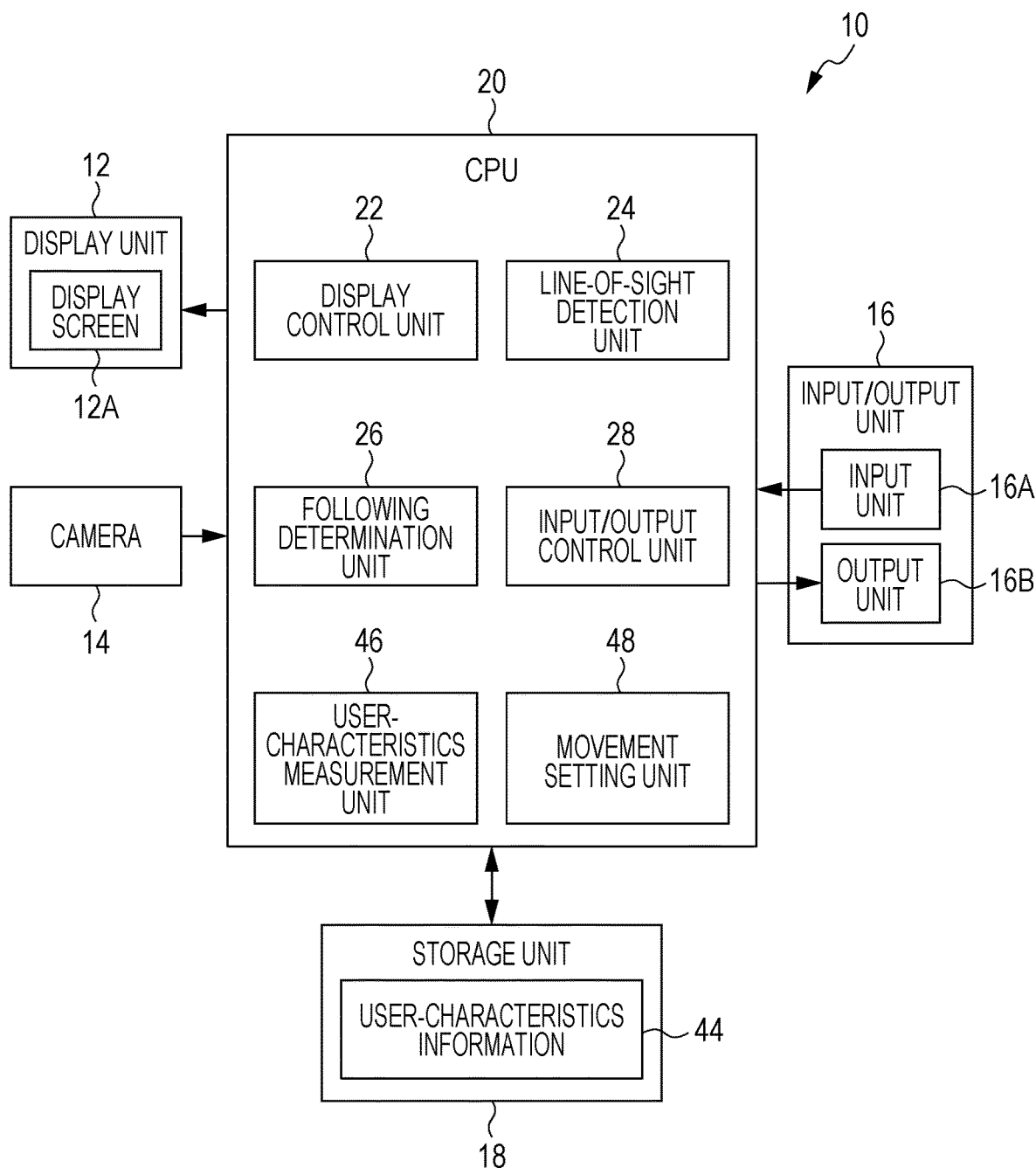
FIG. 13 is a block diagram illustrating a configuration example of the line-of-sight operation apparatus according to a forth embodiment of the present invention.

FIG. 13 is a block diagram illustrating a configuration example of the line-of-sight operation apparatus 10 according to the forth embodiment of the present invention. Note that the same components as those of the line-of-sight operation apparatus 10 according to the first embodiment illustrated in FIG. 1 are denoted by the same reference numerals, and contents that have been described above will be omitted from the following description.

As illustrated in FIG. 13, the storage unit 18 of the line-of-sight operation apparatus 10 according to this embodiment stores user-characteristics information 44 indicating characteristics of the movement of the line of sight of the user (hereinafter referred to as "user characteristics"). In addition, the line-of-sight operation apparatus 10 according to this embodiment includes a user-characteristics measurement unit 46 and a movement setting unit 48. The user-characteristics measurement unit 46 measures the user characteristics for each user. The movement setting unit 48 sets the movement of the animation image on the display screen 12A on the basis of a result of the measurement for each user performed by the user-characteristics measurement unit 46. The display control unit 22 differentiates the movement of the animation image in an icon in accordance with the user characteristics on the basis of setting contents of the movement setting unit 48.

Application Examples of Present Invention

Medical Device Application Example

The present invention is applicable to a medical device for a medical service (diagnosis, care, treatment, and the like) for people or animals. In a medical setting, a medical device (e.g., endoscope apparatus) that is operable by an operator even with his/her hands full is required. In particular, it is considered as useful in a medical service for an emergency patient.

Page Switching Apparatus Application Example

The present invention is applicable to an apparatus that switches pages of a score (so-called page turner) for a player (e.g., pianist) who plays a musical instrument with both hands. That is, a page switching apparatus is provided that can be instructed to switch pages by using line-of-sight input, without the player using both hands, even while the player's both hands are full when switching pages.

Figure 14:
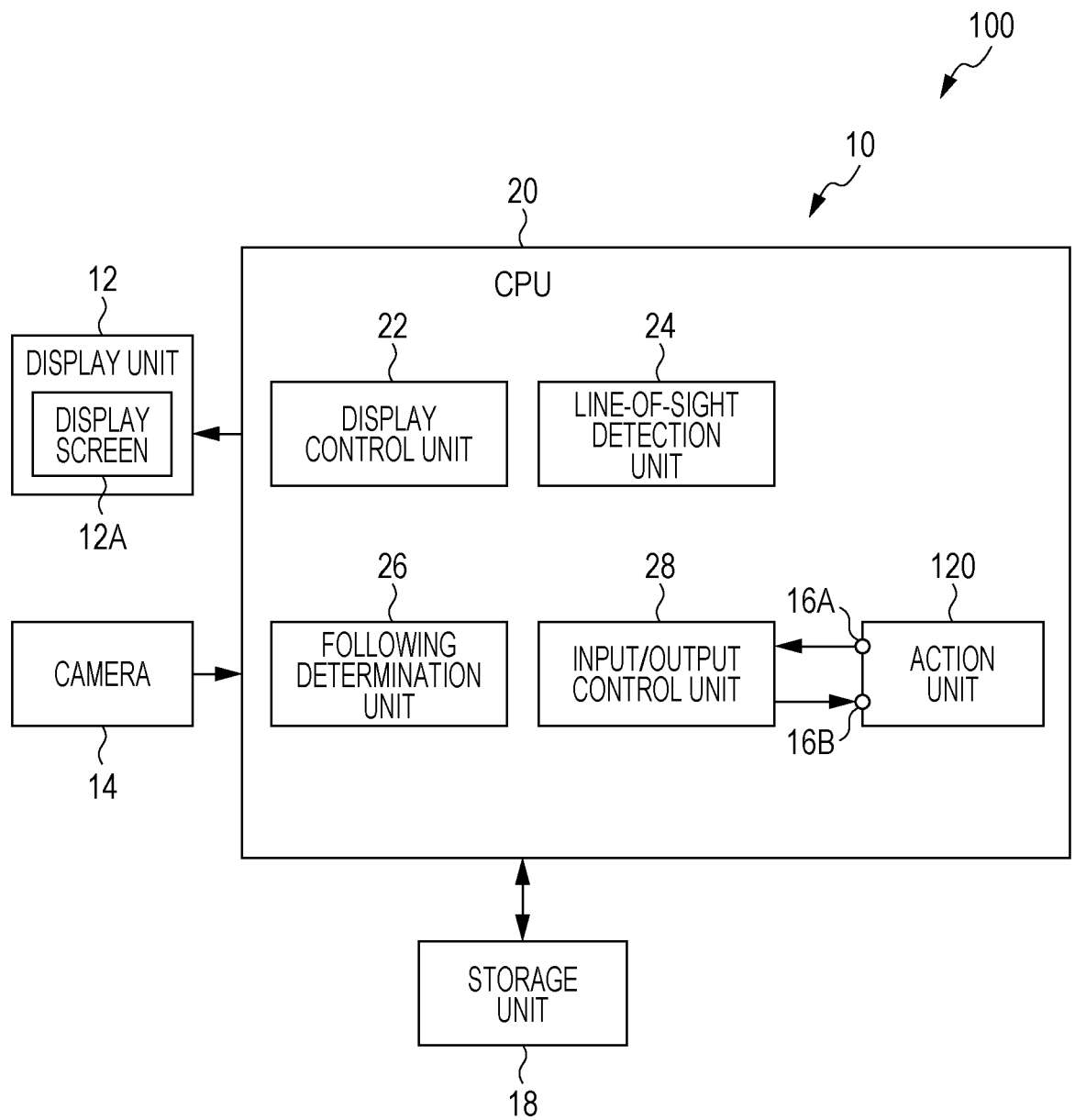
FIG. 14 is a block diagram used for description of a general configuration example of a case in which the present invention is applied to a medical device or a page switching apparatus.
Figure 15:
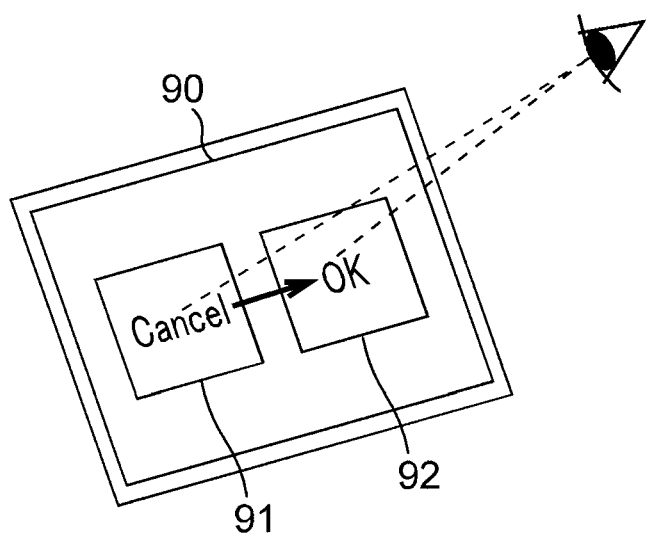
FIG. 15 is an explanation diagram used for description of an object of the present invention.

General Configuration Example of Device to Which Line-of-sight Instruction Apparatus is Applied FIG. 14 is a block diagram used for description of a general configuration example of a case in which the present invention is applied to a medical device. In FIG. 14, the components of the line-of-sight operation apparatus 10 according to the first embodiment illustrated in FIG. 1 are denoted by the same reference numerals. Note that in FIG. 14, portions that are unique to a medical device 100 are omitted from illustration. In addition, FIG. 14 illustrates a case in which the line-of-sight operation apparatus 10 is incorporated in the medical device 100 and in which the CPU 20 is shared.

In FIG. 14, an action unit 120 executes an action in accordance with information that has been output from the output unit 16B. In addition, the action unit 120 inputs a result of the executed action or the like to the input/output control unit 28 via the input unit 16A.

In addition, in FIG. 14, the input unit 16A and the output unit 16B may be an input port and an output port other than special hardware. Furthermore, information may be input and output via a memory.

In a case in which the line-of-sight operation apparatus 10 according to an embodiment of the present invention is incorporated in an apparatus other than the medical device, the configuration can be the same as that illustrated in FIG. 14.

In addition, the medical device may be configured as an apparatus independent of the line-of-sight operation apparatus 10. The same applies to apparatuses other than the medical device.

It is needless to say that the present invention is not limited to the above-described embodiments and that various modifications may be made without departing from the spirit of the present invention.

Reference Signs List

10 line-of-sight operation apparatus
12 display unit
12A display screen
14 camera
16 input/output unit (information input/output unit)
16A input unit (information input unit)
16B output unit (information output unit)
18 storage unit
20 CPU
22 display control unit
24 line-of-sight detection unit
26 following determination unit
28 input/output control unit
32 surrounding characteristics acquisition unit
34 animation image determination unit
40A degree-of-importance information
40B operation-scene information
40C usage information
42 movement setting unit
44 user-characteristics information
46 user-characteristics measurement unit
48 movement setting unit

What is claimed is:
1. A line-of-sight operation apparatus comprising:
a display screen; and at least one processor configured to:

cause an icon having an animation image to be displayed on the display screen;

detect a line-of-sight of a user;

determine, on the basis of a result of detection performed by the processor, whether a movement of the line-of-sight of the user follows a movement of the animation image;

acquire, as display characteristics of a surrounding region, at least any one of a movement, a color, a shape, or a pattern in display of a surrounding region of the icon or a surrounding region of the animation image;

obtain display characteristics within a certain limitation based on the display characteristics of the surrounding region that have been acquired by the processor to determine display characteristics of the animation image; and an output part that outputs information indicating that the icon has been selected in the case where the processor determines that the movement of the line-of-sight of the user follows the movement of the animation image, wherein the processor calculates a following level, on the basis of a movement vector of the line-of-sight of the user and a movement vector of the animation image, and determines whether the movement of the line-of-sight of the user follows the movement of the animation image on the basis of the following level, wherein the movement vector of the line-of-sight of the user indicates a movement direction and a movement amount of the line-of-sight, wherein the movement vector of the animation image indicates a movement direction and a movement amount of the movement vector of the animation image, wherein the following level is calculated as a reciprocal of a difference between an evaluation value corresponding to the movement vector of the animation image and an evaluation value corresponding to the movement vector of the line-of-sight of the user, wherein the certain limitation is a case in which a limitation is provided by setting an evaluation value of the display characteristics of the animation image to a smaller value than that at a normal state, or a case in which a limitation is provided by setting the evaluation value of the display characteristics of the animation image to a larger value than that at the normal state, or a variable limitation in accordance with an operation scene, wherein the processor limits at least any one of the movement, a color, a shape, or a pattern of the animation image, and wherein the processor sets the certain limitation by performing display control of the animation image on the basis of the display characteristics of the animation image determined by the processor.

2. The line-of-sight operation apparatus according to claim 1, wherein the processor differentiates the movement of the animation image in accordance with a selection timing of the icon or a display content on the display screen.

3. The line-of-sight operation apparatus according to claim 2, wherein the processor differentiates the movement of the animation image in accordance with a usage of the icon.

4. The line-of-sight operation apparatus according to claim 1, wherein the processor differentiates the movement of the animation image in accordance with a usage of the icon.

5. The line-of-sight operation apparatus according to claim 1, wherein the processor causes a plurality of icons to be displayed on the display screen and differentiates movements of animation images in the plurality of icons.

6. The line-of-sight operation apparatus according to claim 5, wherein a difference in the movements of the animation images is at least one of a difference in loci of the movements or a difference in speeds of the movements.

7. The line-of-sight operation apparatus according to claim 1, wherein the processor measures characteristics of the movement of the line-of-sight of the user for each user, and wherein the processor sets the movement of the animation image on the basis of a result of the measurement performed by the processor for each user.

8. The line-of-sight operation apparatus according to claim 1, wherein the processor causes a plurality of icons to be displayed on the display screen, and wherein the processor differentiates a length of a time of period for detection of the movement of the line-of-sight between the plurality of icons in the following determination.

9. The line-of-sight operation apparatus according to claim 1, wherein the processor causes a plurality of icons to be displayed on the display screen and causes the plurality of icons to be separated with each other by a certain distance or longer as displayed on the display screen.

10. The line-of-sight operation apparatus according to claim 1, wherein the processor decreases visibility of a surrounding image, which is an image displayed around the icon, compared with visibility of the icon.

11. The line-of-sight operation apparatus according to claim 1, wherein the processor causes a movement of a surrounding image, which is an image displayed around the icon, to be stopped.

12. The line-of-sight operation apparatus according to claim 1, wherein the movement of the animation image is at least any one of a given rotation on the display screen, a movement on a line connecting two opposing sides on the display screen, a movement on a line connecting two opposing corners on the display screen, a given vibration on the display screen, a zigzag movement on the display screen, or a movement with a random locus.

13. A medical device comprising:

a line-of-sight operation apparatus that comprises:

a display screen; and at least one processor configured to:

cause an icon having an animation image to be displayed on the display screen;

detect a line-of-sight of a user;

determine, on the basis of a result of detection performed by the processor, whether a movement of the line-of-sight of the user follows a movement of the animation image;

acquire, as display characteristics of a surrounding region, at least any one of a movement, a color, a shape, or a pattern in display of a surrounding region of the icon or a surrounding region of the animation image;

obtain display characteristics within a certain limitation based on the display characteristics of the surrounding region that have been acquired by the processor to determine display characteristics of the animation image; and an output part that outputs information indicating that the icon has been selected in the case where the processor determines that the movement of the line-of-sight of the user follows the movement of the animation image, wherein the processor calculates a following level, on the basis of a movement vector of the line-of-sight of the user and a movement vector of the animation image, and determines whether the movement of the line-of-sight of the user follows the movement of the animation image on the basis of the following level, wherein the movement vector of the line-of-sight of the user indicates a movement direction and a movement amount of the line-of-sight, wherein the movement vector of the animation image indicates a movement direction and a movement amount of the movement vector of the animation image, wherein the following level is calculated as a reciprocal of a difference between an evaluation value corresponding to the movement vector of the animation image and an evaluation value corresponding to the movement vector of the line-of-sight of the user, wherein the certain limitation is a case in which a limitation is provided by setting an evaluation value of the display characteristics of the animation image to a smaller value than that at a normal state, or a case in which a limitation is provided by setting the evaluation value of the display characteristics of the animation image to a larger value than that at the normal state, or a variable limitation in accordance with an operation scene, wherein the processor limits at least any one of the movement, a color, a shape, or a pattern of the animation image, wherein the processor sets the certain limitation by performing display control of the animation image on the basis of the display characteristics of the animation image determined by the processor, and wherein the medical device performs a process for a medical service in accordance with information that is output from the output part.

14. A line-of-sight operation method of a line-of-sight operation apparatus, the line-of-sight operation apparatus comprising:

a display screen; and at least one processor configured to:

cause an icon having an animation image to be displayed on the display screen;

detect a line-of-sight of a user;

determine, on the basis of a result of detection performed by the processor, whether a movement of the line-of-sight of the user follows a movement of the animation image;

acquire, as display characteristics of a surrounding region, at least any one of a movement, a color, a shape, or a pattern in display of a surrounding region of the icon or a surrounding region of the animation image;

obtain display characteristics within a certain limitation based on the display characteristics of the surrounding region that have been acquired by the processor to determine display characteristics of the animation image; and an output part that outputs information indicating that the icon has been selected in the case where the processor determines that the movement of the line-of-sight of the user follows the movement of the animation image, wherein the processor calculates a following level, on the basis of a movement vector of the line-of-sight of the user and a movement vector of the animation image, and determines whether the movement of the line-of-sight of the user follows the movement of the animation image on the basis of the following level, wherein the movement vector of the line-of-sight of the user indicates a movement direction and a movement amount of the line-of-sight, wherein the movement vector of the animation image indicates a movement direction and a movement amount of the movement vector of the animation image, wherein the following level is calculated as a reciprocal of a difference between an evaluation value corresponding to the movement vector of the animation image and an evaluation value corresponding to the movement vector of the line-of-sight of the user, wherein the certain limitation is a case in which a limitation is provided by setting an evaluation value of the display characteristics of the animation image to a smaller value than that at a normal state, or a case in which a limitation is provided by setting the evaluation value of the display characteristics of the animation image to a larger value than that at the normal state, or a variable limitation in accordance with an operation scene, wherein the processor limits at least any one of the movement, a color, a shape, or a pattern of the animation image, and wherein the processor sets the certain limitation by performing display control of the animation image on the basis of the display characteristics of the animation image determined by the processor, the line-of-sight operation method comprising:

a step of causing the icon having the animation image to be displayed on the display screen;

a step of detecting the line-of-sight of the user;

a step of determining, on the basis of the result of detection of the line-of-sight of the user, whether the movement of the line-of-sight of the user follows the movement of the animation image; and a step of outputting information indicating that the icon has been selected in the case where it is determined that the movement of the line-of-sight of the user follows the movement of the animation image.

15. A line-of-sight operation apparatus comprising:

a display screen; and at least one processor configured to:

cause an icon having an animation image to be displayed on the display screen;

detect a line-of-sight of a user;

determine, on the basis of a result of detection performed by the processor, whether a movement of the line-of-sight of the user follows a movement of the animation image;

acquire, as display characteristics of a surrounding region, at least any one of a movement, a color, a shape, or a pattern in display of a surrounding region of the icon or a surrounding region of the animation image;

obtain display characteristics within a certain limitation based on the display characteristics of the surrounding region that have been acquired by the processor to determine display characteristics of the animation image; and an output part that outputs information indicating that the icon has been selected in the case where the processor determines that the movement of the line-of-sight of the user follows the movement of the animation image, wherein the processor calculates a following level, on the basis of a movement vector of the line-of-sight of the user and a movement vector of the animation image, and determines whether the movement of the line-of-sight of the user follows the movement of the animation image on the basis of the following level, wherein the processor determines that the movement of the line-of-sight of the user follows the movement of the animation image in a case where the following level is higher than or equal to a threshold value, wherein the certain limitation is a case in which a limitation is provided by setting an evaluation value of the display characteristics of the animation image to a smaller value than that at a normal state, or a case in which a limitation is provided by setting the evaluation value of the display characteristics of the animation image to a larger value than that at the normal state, or a variable limitation in accordance with an operation scene, wherein the processor limits at least any one of the movement, a color, a shape, or a pattern of the animation image, wherein the processor sets the certain limitation by performing display control of the animation image on the basis of the display characteristics of the animation image determined by the processor.

* * * * *